US011853457B2

(12) United States Patent
Latka et al.

(10) Patent No.: US 11,853,457 B2
(45) Date of Patent: *Dec. 26, 2023

(54) SELECTIVELY VERIFYING PERSONAL DATA

(71) Applicant: SAP SE, Walldorf (DE)

(72) Inventors: Oliver Latka, Munich (DE); Anja Wilbert, Munich (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,162

(22) Filed: Aug. 2, 2022

(65) Prior Publication Data

US 2022/0414260 A1   Dec. 29, 2022

Related U.S. Application Data

(63) Continuation of application No. 16/705,609, filed on Dec. 6, 2019, now Pat. No. 11,443,062.

(51) Int. Cl.
*G06F 21/62* (2013.01)
*G06F 16/27* (2019.01)
(Continued)

(52) U.S. Cl.
CPC ...... *G06F 21/6245* (2013.01); *G06F 16/2379* (2019.01); *G06F 16/27* (2019.01);
(Continued)

(58) Field of Classification Search
CPC .. G06F 21/6245; G06F 16/2379; G06F 16/27; G06F 21/602; G06F 21/64;
(Continued)

(56) References Cited

U.S. PATENT DOCUMENTS 9,582,680 B2 * 2/2017 Bilodeau ............. G06F 16/9535
9,942,206 B1 * 4/2018 Miller ................. H04L 63/0428
(Continued)

*Primary Examiner* — Mohammed Waliullah
(74) *Attorney, Agent, or Firm* — Buckley, Maschoff & Talwalkar LLC

(57) ABSTRACT

The disclosure relates to a computed-implemented method, a computer program, and a computer system for selectively verifying personal data. The method comprises receiving, by an identity application of a client device, personal data of a user. The method further comprises computing, via a cryptographic hash function, one or more cryptographic hashes from elements of the personal data. The method further comprises storing the cryptographic hashes, an internal identifier and a timestamp as an entry in a distributed database. The internal identifier is unique within the distributed database. The method further comprises receiving a user request from the user. The method further comprises selecting one or more of the elements of personal data for verification. The method further comprises requesting verification of the selected elements of personal data. The method further comprises determining an authorization indication in response to the verification request. When the authorization indication indicates that the verification request has been allowed, the method further comprises verifying the selected elements of personal data using cryptographic hashes from the entry in the distributed database.

17 Claims, 19 Drawing Sheets

(51) Int. Cl.
  *G06F 21/60* (2013.01)
  *H04L 9/06* (2006.01)
  *H04L 9/32* (2006.01)
  *G06F 16/23* (2019.01)
  *G06K 7/14* (2006.01)
  *G06K 19/06* (2006.01)

(52) U.S. Cl.
  CPC ......... *G06F 21/602* (2013.01); *G06K 7/1417* (2013.01); *G06K 19/06037* (2013.01); *H04L 9/0643* (2013.01); *H04L 9/3231* (2013.01)

(58) Field of Classification Search
  CPC .......... G06F 2221/2141; G06K 7/1417; G06K 19/06037; H04L 9/0643; H04L 9/3231
  See application file for complete search history.

(56) References Cited

U.S. PATENT DOCUMENTS

| | | | |
|---|---|---|---|
| 2014/0059355 A1* | 2/2014 | Schuette | G06F 21/6218 713/189 |
| 2015/0278550 A1* | 10/2015 | Lin | H04L 63/04 713/153 |
| 2018/0234433 A1* | 8/2018 | Oberhauser | G06F 21/33 |
| 2019/0014149 A1* | 1/2019 | Cleveland | G06N 3/045 |
| 2019/0377900 A1* | 12/2019 | Balzer | G06F 21/6245 |

* cited by examiner

Login and Register

Email

Password

Login

☑ Keep me logged in    Forgotten your Password?

By logging in you agree to Company 1's Privacy Policy and Terms of Use

LOG IN WITH KOI — 801

LOG IN WITH GOOGLE

LOG IN WITH FACEBOOK

Not a member? Join now

FIG. 8

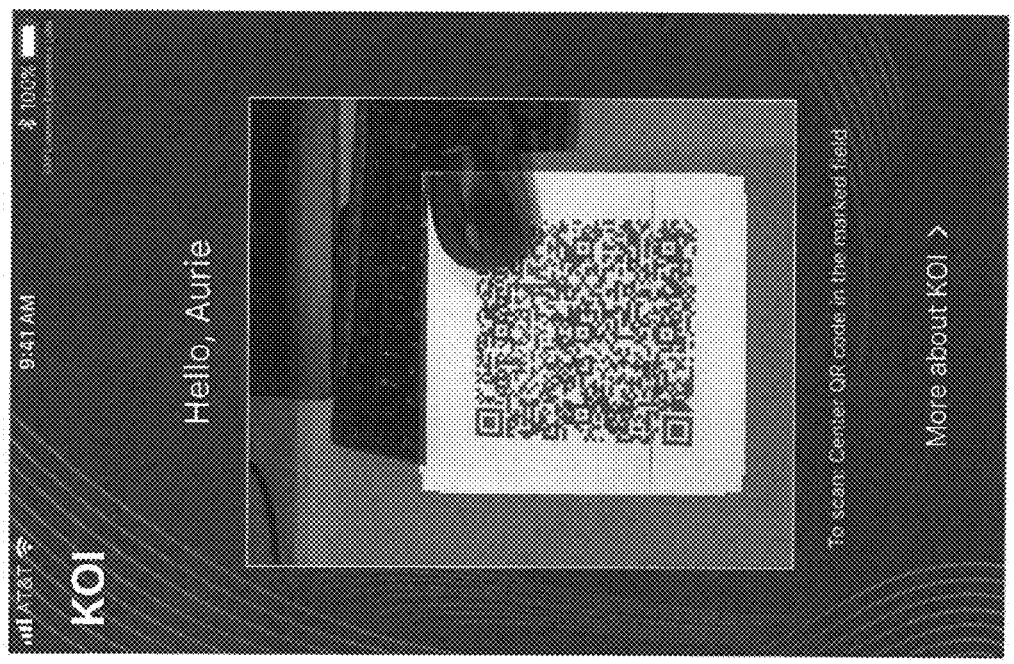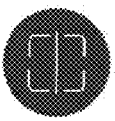
FIG 11

FIG 12

CONSENT REQUEST

Company 1 is requesting for consent to receive the following personal data.

KOJ ID
HgtlZRVccOXIXOjz72563

First Name
Aurie

Last Name
Beck

E-Mail Address
aurie.beck@sap.com

CONFIRM

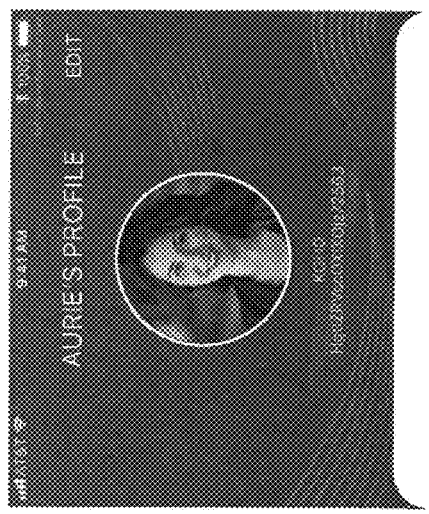
FIG 16

FIG 17

My Account

80% completed

✐ COMPLETE USER PROFILE

KCI ID          Hgt1ZRVccOXtXQjz72563
First Name      Aurie
Last Name       Beck
Date of Birth   1976-06-19
E-Mail Address  aurie.beck@sap.com
Address         Montgelasstrasse 5 Munich Germany

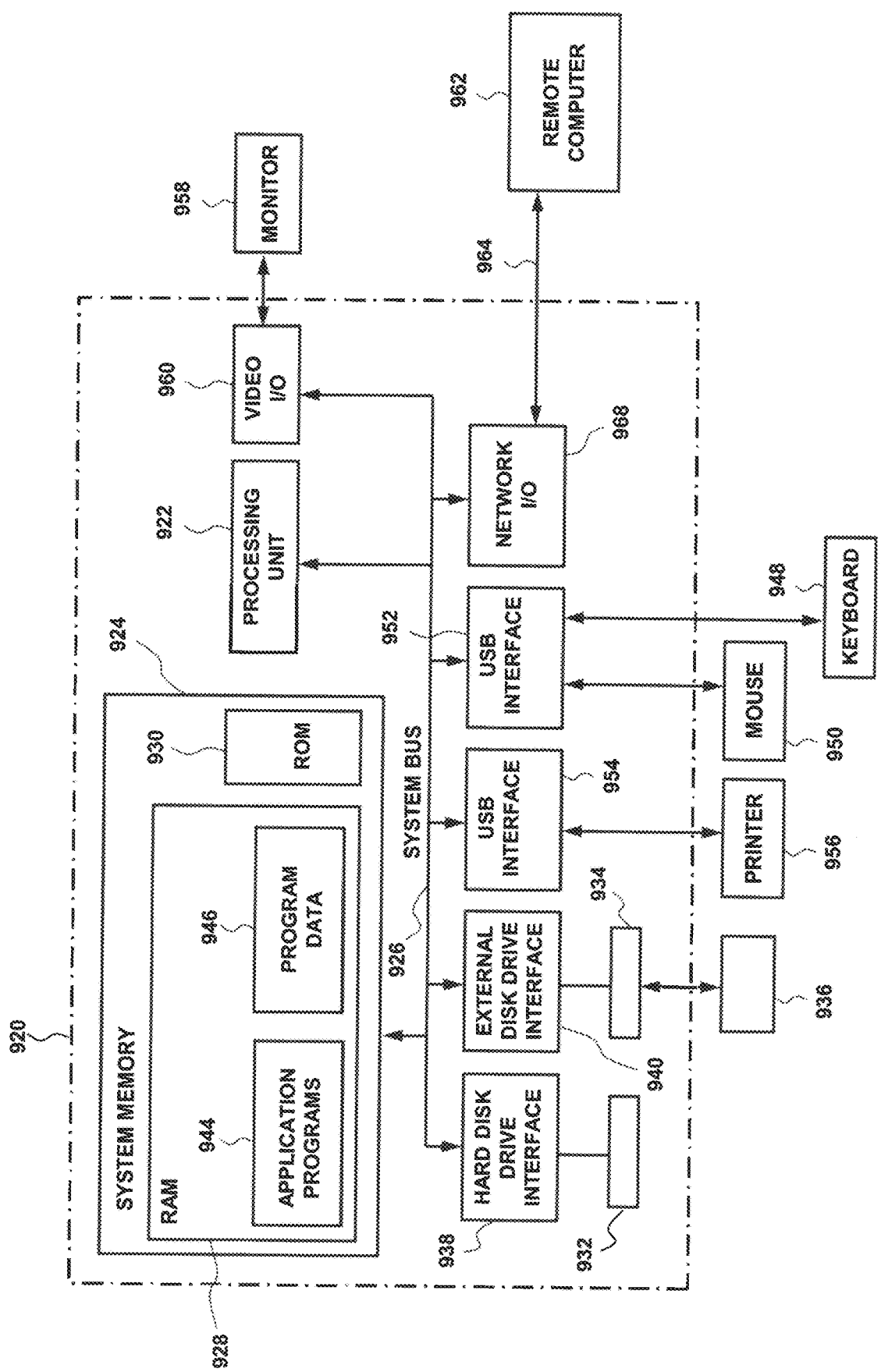

SELECTIVELY VERIFYING PERSONAL DATA

CROSS-REFERENCE TO RELATED APPLICATION

This is a continuation of co-pending prior U.S. patent application Ser. No. 16/705,609, filed on Dec. 6, 2019, entitled "SELECTIVELY VERIFYING PERSONAL DATA", which is incorporated herein by reference in its entirety for all purposes.

DESCRIPTION

The present disclosure relates to selectively verifying personal data, particularly user identification data, via cryptography. Further, the disclosure relates to the sharing and/or distribution of personal data. The disclosure also relates to handling or managing authorization (i.e., consent) to access personal data.

Conventionally, in order to share personal data with a provider (e.g., a service provider, seller or vendor), a user may store credentials or personal information with the provider. Alternatively, the user may interact with multiple verification or distribution services, where each service is accessible through a different portal. For example, the user may interact with Facebook or Google services (e.g., Facebook Connect or Google Sign-In) in order to provide and authenticate personal information with one provider and interact with a different verification service in order to provide and authenticate personal data with a different provider. Further, other providers may be interacted with directly, such that the user is unable to keep track of which information is maintained by which provider. Moreover, some conventional verification approaches might not provide a user with sufficient control over the personal data maintained by different providers.

Accordingly, it may be a problem to provide a gateway or point of access for the selective verification of personal data. In addition, it may be a problem to provide a user with control and easy visualization of each element of personal data that is shared and with whom that data is shared. Further, it may be a problem to provide at least one distribution service for facilitating verification and distribution of the personal data and to facilitate efficient communication between the distribution service, one or more client devices and one or more provider devices. Moreover, it may be a problem to provide a means for verifying personal data without storing the personal data.

According to an aspect, a computer implemented method for selectively verifying personal data is provided. The method comprises receiving, by an identify application of a client device, personal data of a user. The method further comprises computing, via a cryptographic hash function, one or more cryptographic hashes from elements of the personal data. The method further comprises storing the cryptographic hashes, an internal identifier and a timestamp as an entry in the distributed database. The internal identifier is unique within the distributed database. The method further comprises receiving a user request from the user. The method also comprises selecting one or more of the elements of personal data for verification. The method further comprises requesting verification of the selected elements of the personal data. The method further comprises determining an authorization indication in response to the verification request. When the authorization indication indicates that the verification request has been allowed, the method further comprises verifying the selected elements of personal data using cryptographic hashes from the entry in the distributed database.

The personal data is "selectively" verified in the sense that verification is carried out depending on the authorization indication.

Further, once verification has been carried out, verified (i.e., validated) personal data may be used as a trusted identity. The trusted identity may be used wherever proof of identity is required, e.g., for voting.

A "cryptographic hash" refers to a hash computed via a cryptographic hash function. In the context of the present disclosure, the term "hash" refers to a cryptographic hash computed via the cryptographic hash function. The cryptographic hash function may map a (bit) string of arbitrary finite length to a string of fixed length. The cryptographic hash may be contrasted with a checksum in that the cryptographic hash is suitable for detecting not only accidental data alterations but also deliberate data alterations.

The "distributed database" may include a plurality of storage devices that are not attached to a common processor. For example, the distributed database may be stored in multiple computers, wherein the computers are located in the same physical location or dispersed over a network of interconnected computers. The distributed database may consist of loosely coupled sites that share no physical components.

The entry in the distributed database may also be referred to as a transaction. The entry may combine the cryptographic hashes, the internal identifier and the timestamp. The entry may be publicly accessible. The entry may include a digital signature, i.e., the entry may be stored with the digital signature. The digital signature may be from the identity application or from at least one distribution service. The digital signature may be used to verify the data integrity (i.e., the accuracy and consistency) of the entry.

In some examples, the distributed database includes a means for maintaining data integrity. The digital signature may be part of the means for maintaining data integrity. The means for maintaining data integrity may prevent retroactive data alteration and/or tampering with entries in the distributed database.

In some examples, the timestamp is a trusted timestamp and may indicate when the entry was created. The digital signature or a further cryptographic hash may be used to secure the timestamp. Trust (i.e., security) may be provided via a distributed ledger and/or a distributed hash table, as discussed in more detail below.

In some cases, the distributed database includes entries for many users, with a form similar to the one described for the entry above. Each of the entries may include an internal identifier (i.e., its own distinct internal identifier). Each of the internal identifiers may be different from all the other internal identifiers, i.e., substantially unique or unique among the internal identifiers within the distributed database. Accordingly, the internal identifier may serve to distinguish or uniquely distinguish the personal data of the user from the personal data of other users. The internal identifier may be at least 32 bits or at least 64 bits.

In some examples, the user request may be received by a provider device. Accordingly, the selecting of elements of personal data for verification and/or the requesting of verification of selected elements of personal data may also be carried out by the provider device.

Alternatively, the user request may be received by a provider (i.e., a person). The selecting of elements of personal data may be carried out by storing the selection of elements in a machine-readable representation, e.g., a QR code. Requesting verification of the selected elements may be carried out by reading the machine-readable representation.

In some examples, the provider device may include a web server. In addition, the provider device may be a plurality of devices including other computers, such as a database and a firewall. Alternatively, the provider device may be implemented as a mobile device or another form of client computer (e.g., a handheld device suitable for scanning tickets at a stadium).

The personal data may also be referred to as private data. The personal data may include personally identifiable information or other sensitive information. The personal data may include residence, health, financial, or biological information.

The elements of personal data may refer to meaningful parts or constituents of the personal data. For example, the elements of personal data may include one or more of the following: a first name, a last name, a middle name, a street, a city, a zip code, a birth date, and an email address. Other elements are also possible.

The selection of elements of personal data (e.g., by the provider device) may include specifying attributes or identifiers. For example, fields such as, "first name", "last name" and "date of birth" may be selected for verification. Accordingly, when the selected elements of personal data are received by the provider device, the selecting of elements of personal data for verification may be carried out before personal data of the user is received. Alternatively, the provider device may be in possession of elements of personal data (rather than identifiers for those elements) and submit the elements for verification.

The authorization indication may indicate that the verification request has been allowed when the authorization indication indicates that the provider (e.g., the provider device) is authorized access to all of the elements of the personal data specified in the verification request. In some cases, allowing the verification request may be effected by authorizing access to mandatory elements of the personal data in the verification request. Mandatory elements of personal data will be discussed in more detail below.

In the following, examples that may be combined with method, system and computer program aspects are described.

In some examples, communication with the distributed database is processed via at least one distribution service (i.e., the distribution service mentioned above). The distribution service may provide access to the distributed database and/or handle updates to the distributed database.

In some cases, the distribution service may be located remotely from (e.g., on a different computer than) the client device.

In some examples, the distribution service may be implemented as a trusted service.

In some examples, the cryptographic hashes may be computed by the identity application, another application of the client device, or by the distribution service. If the entry in the distributed database includes the digital signature, the digital signature may be computed by the same entity that computed the cryptographic hashes, or by a different entity.

In some examples, a cryptographic hash may be computed for each element of the personal data. In addition or alternatively, one cryptographic hash may be computed from all of the elements of personal data and/or cryptographic hashes may be computed from meaningful combinations of elements of personal data. Moreover, cryptographic hashes may be computed for some of (i.e., a subset of) the elements of personal data. For example, cryptographic hashes may be computed for the full name of the user, the email address of the user, the residence address of the user, and any combination thereof. Further, verifiable combinations of the personal data may be selectable by the user. Accordingly, the user may select combinations of the elements of the personal data for hashing and storage in the distributed database, so as to enable verification. For example, the user may select the combination of the full name and email address for hashing and storage in the distributed database.

Use of cryptographic hashes may enable verification of the personal data without storing the personal data. In particular, it may be that only the hashes of the personal are stored in the distributed database, whereas the personal data is not stored in the distributed database. The personal may be stored on the client device, and optionally, selected provider devices.

The elements of personal data selected for verification (e.g., by the provider device) may include one or more of the combinations of elements.

In some examples, the distributed database may include (i.e., may be implemented using) a peer-to-peer network, e.g., a decentralized peer-to-peer network (as opposed to a hybrid combination of peer-to-peer and client-server models, including a central server that helps peers find each other).

When the distributed database includes a peer-to-peer network, the distributed database may further include the InterPlanetary File System (IPFS).

The distributed database may include means for maintaining data integrity. In some examples, the distributed database provides data integrity using cryptographic hashing and public key cryptography.

In some examples, the distributed database includes at least one hash tree (i.e., a Merkle tree), to ensure that entries received from other nodes are undamaged and unaltered. In the hash tree, each non-leaf node is a hash of its respective child nodes. The root hash may be used as a fingerprint for the distributed database.

In some examples, the distributed database may include a public transaction ledger. More particularly, the distributed database may include a distributed ledger, such as a blockchain, and/or a distributed hash table, such as a Holochain.

When the public transaction ledger may be implemented as a distributed ledger, all of the nodes in the peer-to-peer network may maintain an identical copy of the transaction ledger.

In the present disclosure, a node may refer to a physical device, machine or computer. Alternatively, a node may refer to a virtual machine, e.g., a system virtual machine, such as a hypervisor.

In some examples, the distributed ledger may be spread across several nodes of the peer-to-peer network, where each node replicates and saves an identical copy of the ledger and updates itself independently.

More particularly, the distributed ledger may include a blockchain, i.e., the distributed ledger may be implemented via a blockchain. Entries in the distributed ledger may be grouped into blocks. Each block may be between 1 MB and 32 MB in size.

The blocks form a chain because each block contains a reference to the previous block. For example, each block may include the cryptographic hash of the prior block in the blockchain, thereby linking the two blocks. Such links may repeat all the way back to the genesis block. The linked blocks may constitute the chain. By means of the hashing, data in the blockchain cannot be altered or deleted without leaving a trace (or at least, such alteration is prohibitively difficult). The hashes may also serve to effect trusted timestamps, since the timestamps cannot be modified without changing the result of the hash.

In the context of the blockchain, each block may include a header, containing metadata, followed by entries that make up the bulk of the block. The size of the block header may be between 70 and 120 bits, while the average transaction may be at least 250 bits. The block may include a block size, the block header, a transaction counter and the transactions in the block. The block header may include a version, a hash of the previous block or a reference to a hash of the previous block, a hash of the root of the Merkle tree of the block's transactions, a timestamp, a difficulty target, and a nonce.

Entries in the distributed database may each include a digital signature. Each node in the network (e.g., the peer-to-peer network) may be associated with an identifier and may be provided with a cryptographic public and private key pair. In some cases, the identifier of the node may be the public key of the node. All nodes in the network may have a list of the public keys of the other nodes. When the identifier and the public key are separate, the list may include the respective identifiers of the nodes in addition to the public keys.

In the context of the blockchain, when a node sends a transaction to the blockchain, it signs the transaction with its private key. The transaction may then be broadcast to the other nodes sharing the blockchain, wherein each communication from a node uses the node's identifier. Thus, the other nodes, using the sending node's public key (possibly associated with a separate identifier), can verify the digital signature to check that the communication has not been tampered with.

When the distributed ledger does not include a blockchain, the distributed ledger may include a weighted directed acyclic graph, such as the graph of IOTA Tangle. Alternatively, the distributed ledger may include a Mongo DB cluster, such as the cluster implemented in the BigChainDB.

As an alternative to the distributed ledger, an agent-centric (as opposed to data-centric) implementation including a distributed hash table may provide data integrity. Accordingly, nodes might only have the data that is relevant to themselves and together all the nodes make up the full distributed database. Thus, a set of validation rules may be implemented and each node only tracks its own transaction history. When nodes are ready to interact with each other, they check that the transaction history of the other node is valid according to the validation rules. Invalid transactions can be detected using the validation rules. An exemplary implementation of the agent-centric approach including the distributed hash table is the Holochain.

The distributed hash table may include a plurality of nodes. The distributed hash table may provide a look-up service. Key-value pairs may be stored in the distributed hash table, and any participating node may retrieve the value associated with a given key. Keys may be implemented as unique identifiers. Each key may be mapped to a value. The values may be arbitrary data, such as, addresses or documents. The mapping from keys to values may be distributed among the nodes in such a way that a change to the participating nodes (e.g., removal or addition of a node) causes minimal disruption. The distributed hash table may implement a key space partitioning scheme for splitting ownership of a key space among the nodes and/or an overlaid network that connects the nodes, allowing any node to find a given key in the key space. The key space may be implemented as the set of 160 bit strings.

In some examples, the authorization indication is received from the identity application or from the distribution service. When the authorization indication is received from the distribution service, the authorization indication may be based on information received from the identity application by the distribution service. For example, the identity application may receive input indicating authorization for the provider device to access one or more elements of the personal data. The authorization indication may be provided in response to a request from the provider device or may be initiated from the identity application.

The user request may be received from the client device or directly from the user. When the user request is received directly from the user, the request may be given to a provider and the provider may input the request to the provider device.

The cryptographic hash function may have one or more of the following properties: collision-resistance, pre-image resistance, and resistance to second-pre-images. The cryptographic hash function may be one-way. The cryptographic hash function may be Keecak, SHA-3 (e.g., SHA-3-256), or SHA-2 (e.g., SHA-256).

The personal data may comprise user identification data. Receiving the personal data may comprise reading (e.g., scanning or otherwise retrieving by a form of energy) the user identification data from an identity document or identity card. The user identification data may include any of the elements of personal data mentioned above, particularly, the full name and the data of birth.

In some examples, the client device is a mobile device. The mobile device may be a laptop, a tablet, or a smartphone.

In some examples, the method further comprises storing the personal data and the internal identifier in a memory of the client device. In some cases, the storing may include encrypting the personal data and the internal identifier in an encrypted database in the memory of the client device. An operating system of the client device may control access to the encrypted database. The encrypted database may be implemented using a system-wide application programming interface—API—(e.g., the Keychain services API available for Apple iOS and Google Android) that provides access to multiple applications on the client device. Alternatively, the encrypted database may be implemented via a restricted application programming interface (e.g., the KeyStore API available for Apple iOS and Google Android) that restricts access to the identity application. In particular, the restricted API may restrict access to the encrypted database to a single application, e.g., the identity application.

In some cases, verifying the selected elements of personal data using the cryptographic hashes is performed by the distribution service. In other cases, the provider device may retrieve the entry from the distributed database and perform verification. For example, the provider device may receive the selected elements of personal data from the client device and verify hashes of the selected elements of personal data against the hashes in the entry retrieved from the distributed database. Alternatively, the identity application may verify hashes of the selected elements of personal data against the hashes in the entry retrieved from the distributed database (or cached on the client device). The display of the identity application may be shown to the provider as verification (e.g., the identity application may be known to and trusted by the provider).

The data integrity of the entry may be verified via the digital signature of the entry.

Additionally or alternatively, the data integrity of the entry may be verified via a zero knowledge proof or zero knowledge protocol. Accordingly, randomized information may be exchanged between the verifier (e.g., the provider device) and the prover (e.g., the client device or the distribution service). The prover may create a proof using a proving key, instance parameters (public and private inputs) and random elements. The verifier may take the proof and a verification key, add the public inputs and use a verifier algorithm to decide whether the proof is valid for the inputs. In some cases, a common reference string shared between the prover and the verifier is all that is needed to provide computational zero-knowledge. Further information on zero-knowledge proofs can be found here: "Sonic: Zero-Knowledge SNARKs from Linear-Size Universal and Updatable Structured Reference Strings", Mary Mailer, et al.

In some examples, the verifying comprises sending one or more messages from the distribution service to the provider device via an application protocol (i.e., an application layer protocol). The application protocol may be part of the Transmission Control Protocol/Internet Protocol (TCP/IP) suite of protocols.

In some cases, the application protocol has one or more of the following characteristics:
asynchronous and/or non-blocking,
bi-directional,
full-duplex,
based on TCP or relies on TCP,
Hypertext Transfer Protocol (HTTP) compatible.

The client device may communicate with the distribution service via the application protocol. The application protocol may be the WebSocket protocol. Non-blocking may refer to a capability of sending multiple requests without waiting for each response. Asynchronous may refer to a capability of the distribution service to initiate a connection without waiting for a request. Similarly, the client device and/or the provider device may be able to send messages to the distribution service without waiting for requests. Bi-directional may refer to the capability of both sides of a connection to send unsolicited messages (i.e., without requests). Full-duplex may refer to simultaneous communication from both sides of the connection. The application protocol may rely on TCP as opposed to the user datagram protocol (UDP) or some other transport protocol. HTTP-compatible may refer to the capability of being handled by devices that can handle HTTP. The application protocol may communicate over port 80, port 443 or any other network port.

In some examples, the distribution service comprises a plurality of microservices, e.g., according to the Eclipse MicroProfile. The microservices may be implemented using different programming languages, hardware or software and may be independently deployable. The distribution service may be implemented on multiple computers and the computers may be connected by a computer network. The distribution service may be accessed via a portal or a network application programming interface (e.g., a representational state transfer—REST—interface). Accordingly, the distribution service may provide access to the distributed database. Further, the distribution service may enable selective verification of personal data of any user by an arbitrary provider.

When the user request is received by the provider device and the provider device includes a remote computer, the method may further comprise authenticating, by the provider device and prior to requesting verification of the selected elements of personal data, the user by means of the internal identifier. For example, after the user has been authenticated via the identity application, the identity application may provide credentials including the internal identifier to the provider device to authenticate the user.

The entry may further comprise one or more of the following:
a backup mode specifying whether to back up the personal data,
a restore mode specifying how to restore backed up personal data,
a security mode specifying how to process the personal data when the client device is lost, and
an offline mode specifying how to share the personal data when the client device is offline.

When the backup mode is enabled, the personal data of the user may be backed up, e.g., on a backup storage system. When the backup mode is disabled, the personal data may be lost if the user device is lost. The personal data might not be stored in the distributed database. Not storing the personal data in the distributed database may improve the efficiency of the distributed database. In particular, it may improve the efficiency of the distributed database to minimize the size of the entries, as well as the size of collections of entries (e.g., block size in the case of the blockchain).

The restore mode may only be applicable if the backup mode is enabled. The restore mode may provide options for restoration of backed up personal data.

The security mode may specify automatic restoration of the personal data when the client device is lost and the user authenticates with a new client device. Alternatively, the security mode may specify that the personal data is to be deleted when the client device is lost.

The offline mode may enable sharing of the personal data (e.g., with the provider device or other provider devices) when the client device is offline. Alternatively, the offline mode may be disabled, such that sharing of the personal data of the user is not possible when the client device is offline.

The method may further comprise authenticating, prior to receiving the user request, the user by the identity application via a biometric identifier of the user. The biometric identifier may comprise a fingerprint or characteristics of facial features. The characteristics of facial features may include at least one of the following: relative size, relative position, shape. The facial features may include at least one of the following: eyes, nose, cheekbones, jaw.

For example, the user may be authenticated via a fingerprint recognition system or a facial recognition system. Accordingly, the client device may include sensors to capture a digital image of a fingerprint pattern or a face. Optical imaging may also be used. The facial recognition system may include three-dimensional recognition and/or skin texture analysis. In addition or alternatively, voice or heartbeat authentication may be used. In particular, the voice of the user or the heartbeat of the user may be analyzed in order to authenticate the user. Other forms of authentication (e.g., user name and password) may also be used.

The method may further comprise maintaining, by the distribution service, a list of approved providers for the user, wherein each provider on the list is authorized to maintain at least one element of the personal data. The method may further comprise receiving, by the distribution service and from the client device, a change to the personal data. The method may further comprise sending an update corresponding to the change to each provider device on the list of approved providers.

Each provider may correspond to one or more provider devices.

The list of approved providers may include contact information such as a unique provider identifier or other information that can be used to provide or push information to corresponding provider devices. In this respect, use of the application protocol discussed above may be advantageous. In particular, the capability of the application protocol to push information without a corresponding request for that information (as is typically required with HTTP) may be advantageous.

Provider devices may use a subscription, e.g., provided by the distribution service. Establishing the subscription may include setting up a connection using the application protocol, e.g., a WebSocket connection. For each user, a list of provider devices that the user has authorized to store at least one element of personal data may be maintained. Accordingly, when a change in personal data elements of a user is carried out, the change may be pushed (i.e., sent) to subscribed provider devices on the respective user list via the established connection.

Requesting the verification may further comprise reading, by the client device, a machine-readable representation of the verification request from the provider device (i.e., the machine-readable representation mentioned above). The machine-readable representation may include a barcode, such as a quick response (QR) code. Accordingly, the request for the verification by the provider device may involve displaying the machine-readable representation on the provider device so that the machine-readable representation can be scanned by the client device. Alternatively, the verification request may be sent directly to the distribution service or may involve use of the client device to read a printed machine-readable representation, e.g., from a piece of paper.

Additionally or alternatively, requesting the verification may further comprise an electronic interaction between the client device and the provider device. For example, the verification request may be carried out via near-field communication (NFC), Bluetooth or WiFi (i.e., wireless networking based on the IEEE 802.11 standards).

The selected elements of personal data may include one or more mandatory elements. Accordingly, the selection may specify that one or more of the selected elements are mandatory elements. The provider device may be configured to perform an action only after receiving the mandatory elements. In other words, the provider device might not perform the action without receiving the mandatory elements of personal data. The selected elements of personal data may include optional elements. The provider device may be configured to perform the action even if the optional elements of the personal data are not received.

The selected elements of personal data may consist of mandatory elements. Alternatively, it may be desirable to reduce the number of mandatory elements as much as possible so as to reduce the burden on the user and/or maintain privacy of the user.

In some cases, the mandatory elements may be limited to the internal identifier. At least one of a last name, a date of birth and an email address may be mandatory data elements. These data elements could also be optional. Other personal data elements (e.g., payment details such as a credit card number) might also be mandatory elements.

The first name, last name and email address may be optional data elements.

The following examples are intended to be illustrative.

In one example, the user request may be for entering a country. The provider (e.g., provider device) may select elements of the personal data needed for a travel visa and to allow entry into the country. Mandatory personal data elements may include the internal identifier, the full name of the user and the nationality of the user. Optional data elements may include a date of birth. The request for verification may be delivered to the client device via a machine-readable representation of the provider that is read by the client device.

In this example, and others, the authorization indication may be determined by checking a flag. In particular, it may be assumed that the entity responsible for checking the travel visa is trusted and that the verification request should be allowed.

In another example, the user request may be to buy goods at a provider device (e.g., an online store). Provider devices of the provider may include a web server configured to select the internal identifier, and email address of the user for verification. The request for verification may be carried out by displaying a machine-readable representation (e.g., QR code) on a screen of the user's desktop computer. The user may scan the machine readable representation using the client device.

In yet another example, the user request may be to confirm a reservation in a restaurant. The provider may (e.g., the provider device may be configured to) select an internal identifier, last name and email address of the user as mandatory data elements for verification. Optional data elements may include a first name of the user. The verification request may be carried out by displaying a machine-readable representation on a provider device (e.g., a smartphone) or by providing the machine-readable representation (e.g., printed on a sheet of paper) to the user for scanning via the client device.

In the two preceding examples, and others, the authorization indication may be received from the distribution service or cached on the provider device (e.g., the web server or the smartphone).

The method may further comprise receiving, by the distribution service from the client device, a deletion request to delete at least one element of the personal data from the provider device and to revoke authorization for the provider device to access the element of personal data in the deletion request. The method may further comprise instructing, by the distribution service, the provider device to remove the element of personal data according to the deletion request.

The method may further comprise receiving, by the distribution service from the client device, a request to update or add at least one element of personal data for the provider device. The method may further comprise providing, by the distribution service, the provider device with the updated or additional personal data element. Additionally or alternatively, the update may involve a change to the authorization for the personal data element.

According to another aspect, a computer program is provided. The computer program comprises instructions that, when the program is executed by a computer, cause the computer to carry out the method described above. The computer program may be embodied in a product (i.e., a computer program product), or in a computer-readable medium. More particularly, the computer program may be tangibly embodied in the computer readable medium.

According to yet another aspect, a computer system corresponding to the method described above is provided. In particular, a computer system for selectively verifying personal data is provided. The computer system comprises a client device. The client device comprises an identity application. The identity application is configured to receive personal data of a user. The computer system further comprises at least one distribution service configured to receive the personal data from the client device. The distribution service is further configured to compute, via a cryptographic hash function, one of more cryptographic hashes from elements of the personal data. The computer system further comprises a distributed database. The distributed database is configured to store, upon request from the distribution service, the cryptographic hashes, an internal identifier and a timestamp as an entry. The internal identifier is unique within the distributed database. The computer system further comprises a provider device configured to receive a user request from the user, select one or more elements of the personal data for verification and request verification of the selected elements of personal data. The provider device is further configured to determine an authorization indication in response to the verification request. The distribution service is further configured to, when the authorization indication indicates that the verification request has been allowed, verify the selected elements of personal data using cryptographic hashes from the entry in the distributed database.

The subject matter described in this disclosure can be implemented as a method or on a device, possibly in the form of one or more computer programs (e.g., computer program products). Such computer programs may cause a data processing apparatus to perform one or more operations described in the present disclosure.

The subject matter described in the present disclosure can be implemented in a data signal or on a machine readable medium, where the medium is embodied in one or more information carriers, such as a CD-ROM, a DVD-ROM, a semiconductor memory, or a hard disk.

In addition, the subject matter described in the present disclosure can be implemented as a system including a processor, and a memory coupled to the processor. The memory may encode one or more programs to cause the processor to perform one or more of the methods described here. Further subject matter described in the present disclosure can be implemented using various machines.

Details of one or more implementations are set forth in the exemplary drawings and description that follow. Other features will be apparent from the description, the drawings, and from the claims.

BRIEF DESCRIPTION OF THE FIGURES

FIG. 6 shows an expanded version of the screenshot depicted in FIG. 5.

FIG. 7 shows the screenshot of FIG. 6 after a date of birth has been input by the user.

FIG. 8 shows a provider device authenticating the user by means of an internal identifier.

FIG. 11 shows the machine-readable representation being scanned by the identity application.

FIG. 12 shows a request for authorization of elements of personal data provided by the identity application.

FIG. 16 shows a screenshot from the identity application depicting elements of personal data of the user.

FIG. 17 shows a screenshot from the identity application for editing elements of personal data of the user.

FIG. 19 shows an exemplary system for implementing disclosed aspects in the form of a conventional computing environment.

DETAILED DESCRIPTION

In the following text, a detailed description of examples will be given with reference to the drawings. Various modifications to the examples may be made. In particular, one or more elements of one example may be combined and used in other examples to form new examples.

Figure 1:
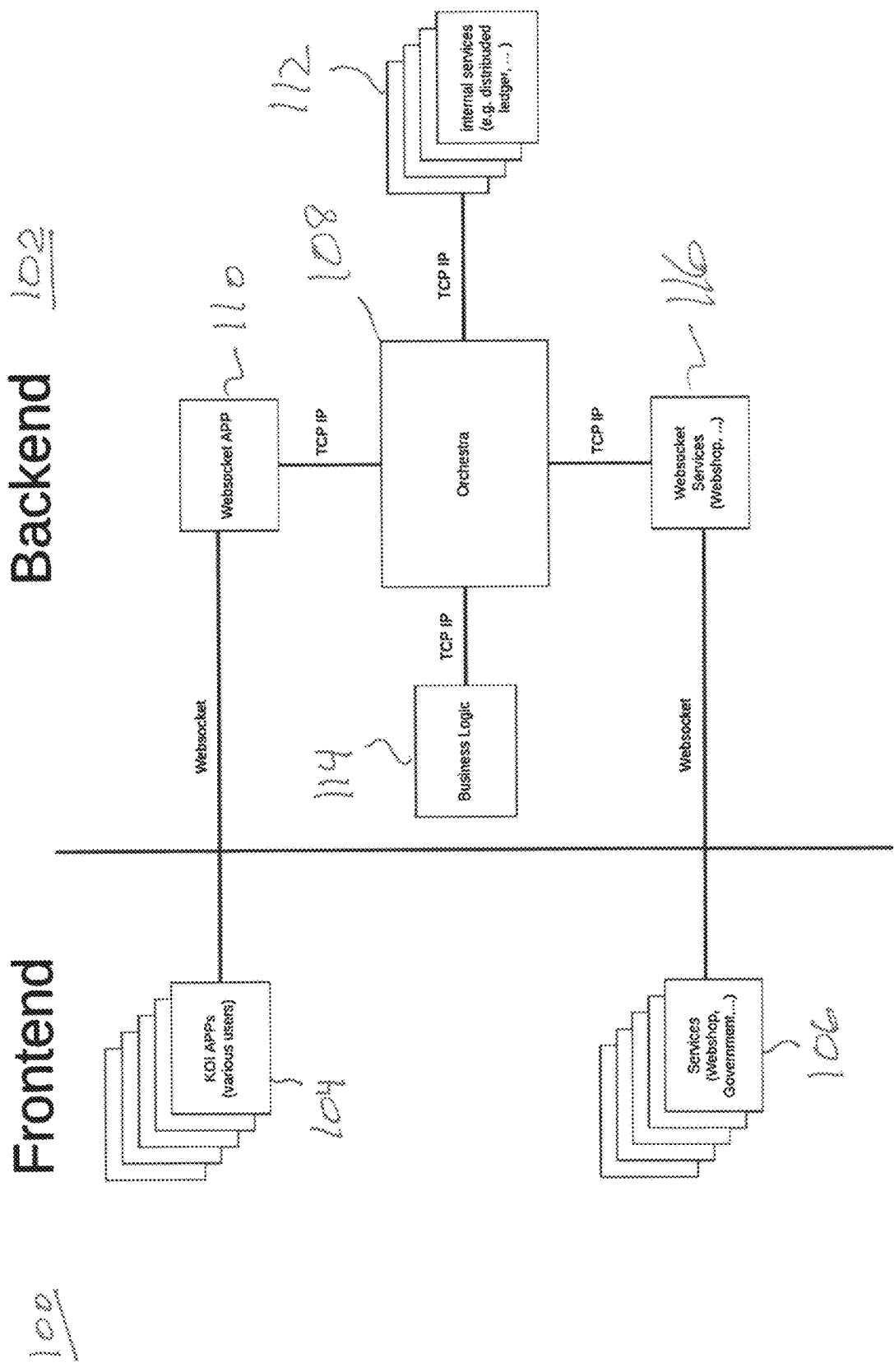
FIG. 1 shows an architecture of a computer system that can be used to implement disclosed examples.

FIG. 1 shows a computer system for selectively verifying personal data. The computer system is divided into a frontend 100 and a backend 102. The frontend includes a plurality of identity applications 104, each of the identity applications 104 being accessible by a different user. Accordingly, the identity applications 104 support various users. Further, each of the identity applications 104 may execute on a different client device. The frontend 100 may also include a plurality of provider devices 106.

In the depicted example, the provider devices 106 offer various services, particularly online retail services (e.g., consumer goods) and government services. In addition or alternatively, the provider devices 106 may include providers of goods or services for health care, education/training, personal data storage, travel, government, public transportation (e.g., subway or bus), vehicle rental (e.g., car or bicycle), and others. The provider devices 106 may also include Internet of Things devices. Internet of Things devices may include lighting fixtures, thermostats, home security systems and cameras, home appliances, rental cars, etc. In addition or alternatively, providers of insurance, industrial applications and infrastructure applications may be included in the provider devices 106.

Communication between the frontend 100 and the backend 102 may be carried out using the WebSocket protocol. Other bi-directional messaging protocols could also be used, particularly when full-duplex and/or asynchronous communication is supported.

The backend 102 may include a plurality of microservices. In particular, the backend 102 may be implemented via multiple services and each service may have multiple instances. Load across the instances of each service may be balanced via a load balancer. The backend may include an orchestration service 108 for scheduling computations among other services and providing centralized login and performance monitoring.

A WebSocket application 110 may provide a portal or network application programming interface for interfacing between the identity applications 104 and other services in the backend 102. At least one internal service 112 may provide an interface to a distributed database (not shown). When the distributed database includes a distributed ledger, the internal service 112 may provide an interface to the distributed ledger. Alternatively, when the distributed database includes a distributed hash table, the internal service 112 may provide an interface to the distributed hash table.

Business logic 114 may process commands, make logical decisions and perform evaluations and calculations. For example, the business logic 114 may handle addition and removal of storage devices supporting the distributed database. The business logic 114 may also ensure replication across nodes when the distributed database includes the distributed ledger.

At least one WebSocket service 116 may provide an interface between the provider devices 106 and other services in the backend 102. Services in the backend 102 may be collectively referred to as distribution services. In particular, the WebSocket app 110, the orchestration service 108, the business logic service 114, the WebSocket service 116 and the internal service 112 may be collectively referred to as distribution services.

Further, communication between the frontend 100 and the backend 102 may be encrypted, e.g., via transport layer security (TLS). Alternatively or additionally, other cryptographic protocols designed to provide communication security over a computer network may also be used. Protocols of the TCP/IP protocol suite (e.g., HTTP) may be used to communicate among the services of the backend 102.

Figure 2:
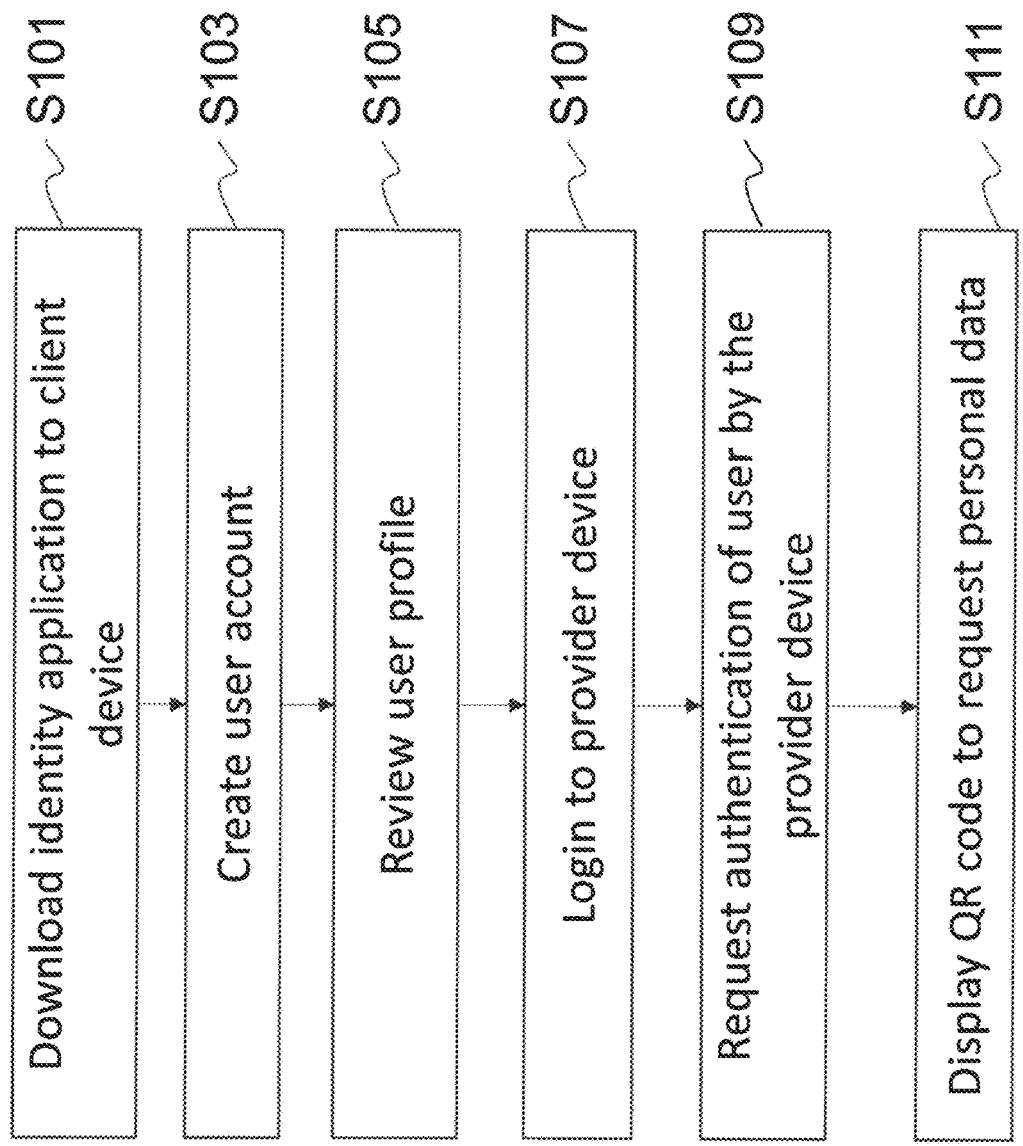
FIG. 2 shows a first part of a flow chart for an exemplary use case according to the present disclosure.
Figure 3:
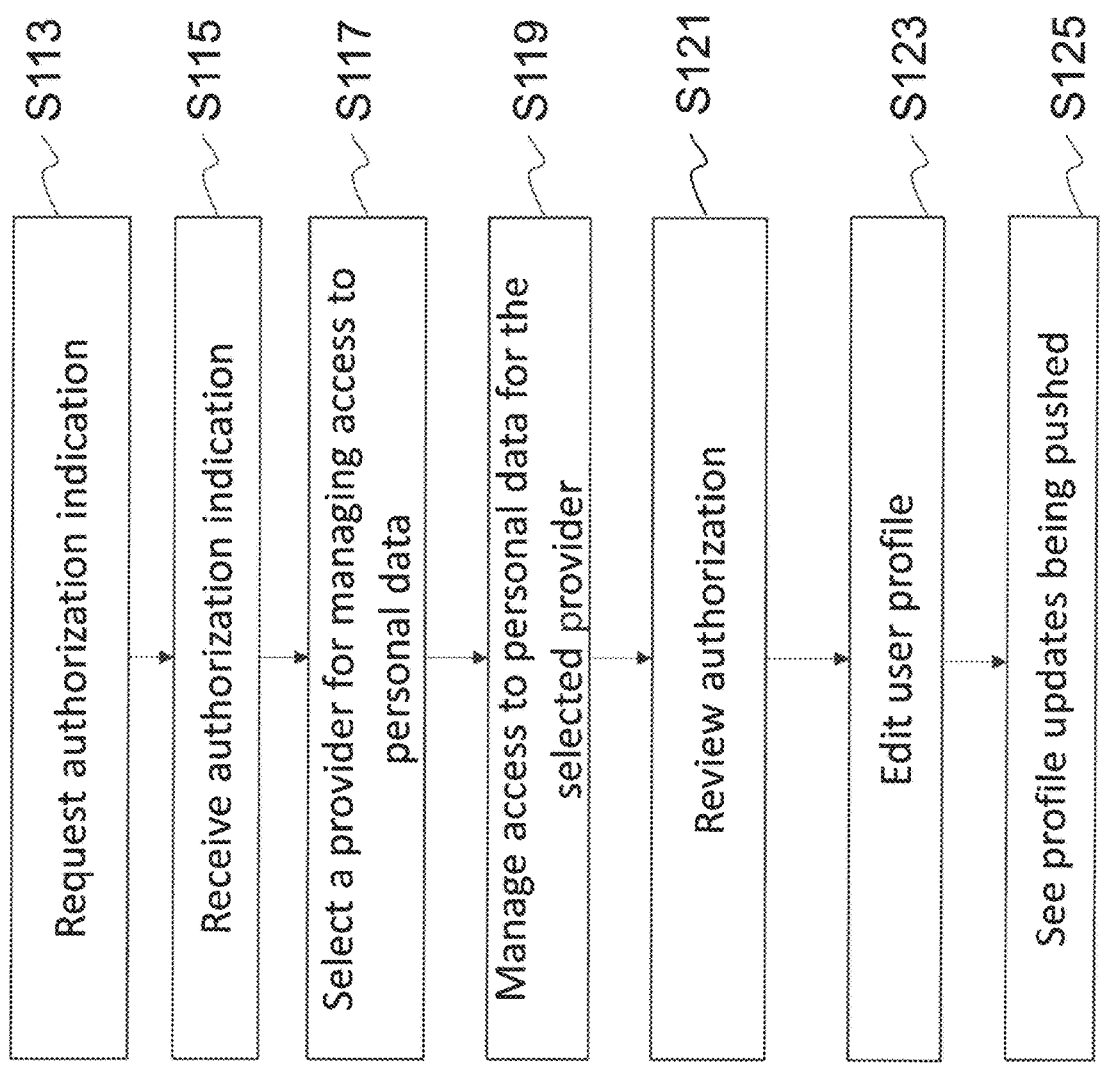
FIG. 3 shows a second part of the flow chart.

FIGS. 2 and 3 show a flow chart describing a typical set of interactions with the computer system depicted in FIG. 1. Unless otherwise indicated, steps in the flow chart may be omitted; moreover, further steps may be added. A first part of the flow chart is depicted in FIG. 2 and a second part of the flow chart is depicted in FIG. 3. In particular, the first step, S113 of FIG. 3 directly follows the final step, S111, of FIG. 2.

At step S101, the identity application 104 is downloaded to the client device. The client device may be implemented as a mobile device, such as a smartphone. The identity application 104 may be downloaded by interacting with the WebSocket application 110 and/or other distribution services in the backend 102.

Figure 5:
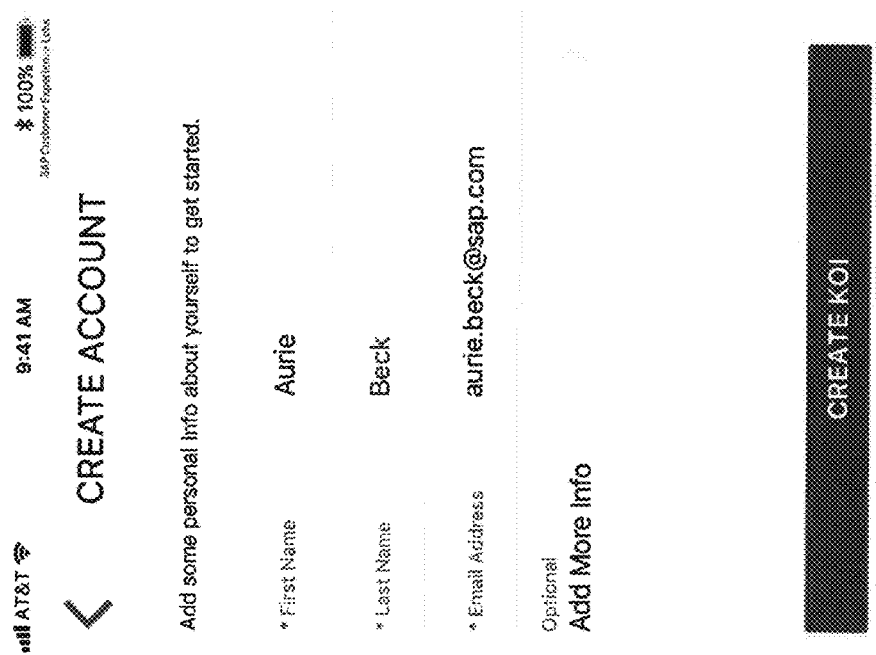
FIG. 5 shows a screenshot that may be provided by the identity application in order for the user to input personal data.

After the identity application 104 is installed on the client device, a user account for a user of the client device may be created at step S103. A screenshot (i.e., screen capture or digital image of a display) for creating the user account is shown in FIG. 5 (see below).

At step S105, the user may review a new user profile, as shown in FIG. 16 and described in more detail below. The user profile may include a plurality of elements of personal data of the user, e.g., all elements of personal data of the user.

At step S107, the user may log in to the provider device 106 from the identity application 104. A screenshot of an exemplary login screen is shown in FIG. 8 and described in more detail below. The user may log in via an internal identifier. The internal identifier may be internal with respect to the distribution services of the backend 102. The internal identifier may be maintained in the distributed database.

At S109, the provider device may authenticate the user, i.e., request authentication of the user. The request may be sent to the backend 102, or more particularly, one of the WebSocket services 116. After the identity of the user has been confirmed, the confirmation may be sent to the provider device 106 as a response to the authentication request.

Figure 10:
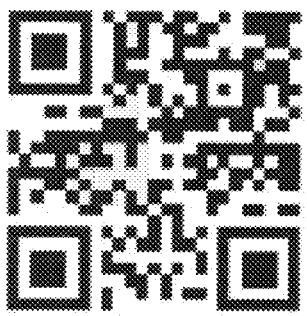
FIG. 10 shows a machine-readable representation of a verification request from the provider device.

At step S111, the provider device 106 may display a QR code to request personal data of the user. In particular, the QR code is a machine-readable representation that can be used to implement a verification request for selected elements of personal data of the user. Selecting elements of personal data may include specifying elements of the personal data of the user that the provider device 106 needs or would like to receive, or specifying elements of the personal data that the provider device would like to have verified. A screenshot of a QR code that may be displayed by the provider device 106 is shown in FIG. 10 and described in more detail below. A screenshot of the identity application 104 scanning the QR code is shown in FIG. 11.

FIG. 3 is a continuation of the flow chart that began in FIG. 2. Accordingly, step S113 directly follows step S111. In step S113, the provider device 106 may request an authorization indication from the WebSocket service 116. The authorization indication may explicitly specify the selected elements of personal data of the user that are needed by the provider device 106. Alternatively, the authorization indication may specify a code that indicates the selected elements of personal data.

In some cases, a consent request includes elements of personal data of the user selected by the provider device 106. The authorization indication may provide authorization for the provider device 106 to access one or more of the selected elements of personal data. When the authorization indication indicates that the verification request has been allowed, the authorization indication may indicate that all of the selected elements of personal data may be accessed by the provider device 106.

At step S115, the authorization indication may be received by the provider device 106. The authorization indication may be provided in response to the consent request, as shown in FIG. 12. The authorization indication may be pushed from the WebSocket service 116 to the provider device 106.

Alternatively, the authorization indication may be determined by the provider device 106, e.g., based on a response to a previous verification request.

When the authorization indication indicates that the verification request has been allowed, the selected elements of personal data may be verified by means of the cryptographic hashes stored in the distributed database. More particularly, when the authorization indication indicates that the verification request has been allowed (i.e. is authorized) the provider device 106 may be provided with the selected elements of personal data. The selected elements of personal data may be verified using the corresponding cryptographic hashes from the distributed database.

For example, the provider device 106 may provide the selected elements of personal data to the WebSocket service 116 for verification. Alternatively, cryptographic hashes may be provided by the WebSocket service 116 for verification of the selected elements of personal data. In particular, the provider device 106 may compute its own cryptographic hashes of the selected elements of personal data and verify those computed cryptographic hashes against the cryptographic hashes from the distributed database.

Steps S117 to S125 may be carried out independently of the preceding steps. In particular, steps S117 to S125 relate to managing authorization to access personal data and managing changes to personal data.

Figure 14:
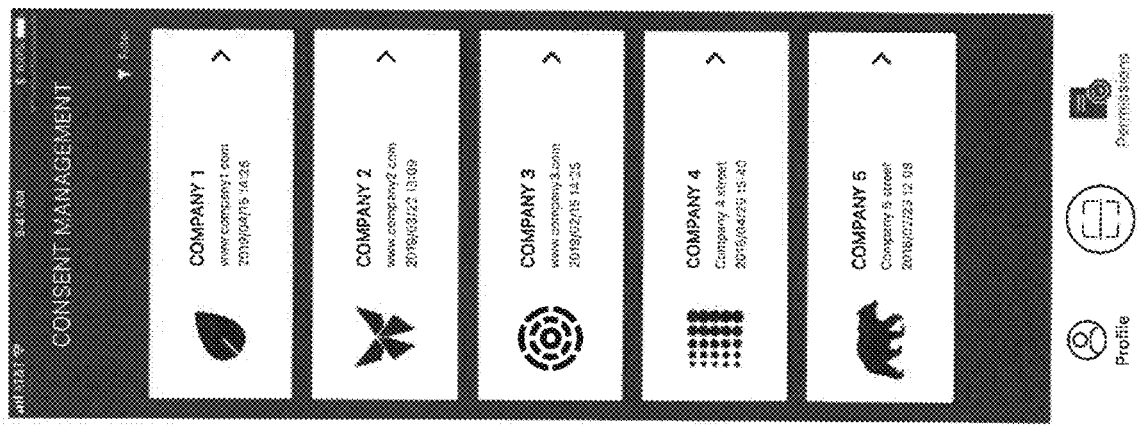
FIG. 14 shows a screenshot from the identity application for authorizing various providers.

At step S117, the user may select a provider for managing access to personal data. In particular, the user may access the identity application 104 and select the provider. A screenshot from the identity application 104 showing providers that can be selected by the user is depicted in FIG. 14 and described in more detail below. The provider may be selected from a list of approved providers maintained by the distribution service for the user. Each provider on the list of approved providers may be authorized to maintain at least one element of the personal data. The distribution service may maintain information regarding the elements of personal data of the user that each of the approved providers is authorized to maintain. In addition, the distribution service may maintain a blacklist of providers that are not authorized to maintain any personal data of the user. Each provider on the list of approved providers may correspond to one or more of the provider devices 106.

At step S119, the user may manage access to personal data for the provider selected in step S117. For example, if the user selected the provider "company 1", the user might be presented with a screen similar to the screenshot depicted in FIG. 15 and described in more detail below. The screen would be displayed in the identity application 104.

Step S119 may include receiving, by the WebSocket service 116, a change to the personal data of the user at step S121. In particular, the user may review authorization to access personal data and decide that the authorization for the provider (e.g., company 1) should be changed. The change may be effected by accessing the identity application 104.

Figure 17:
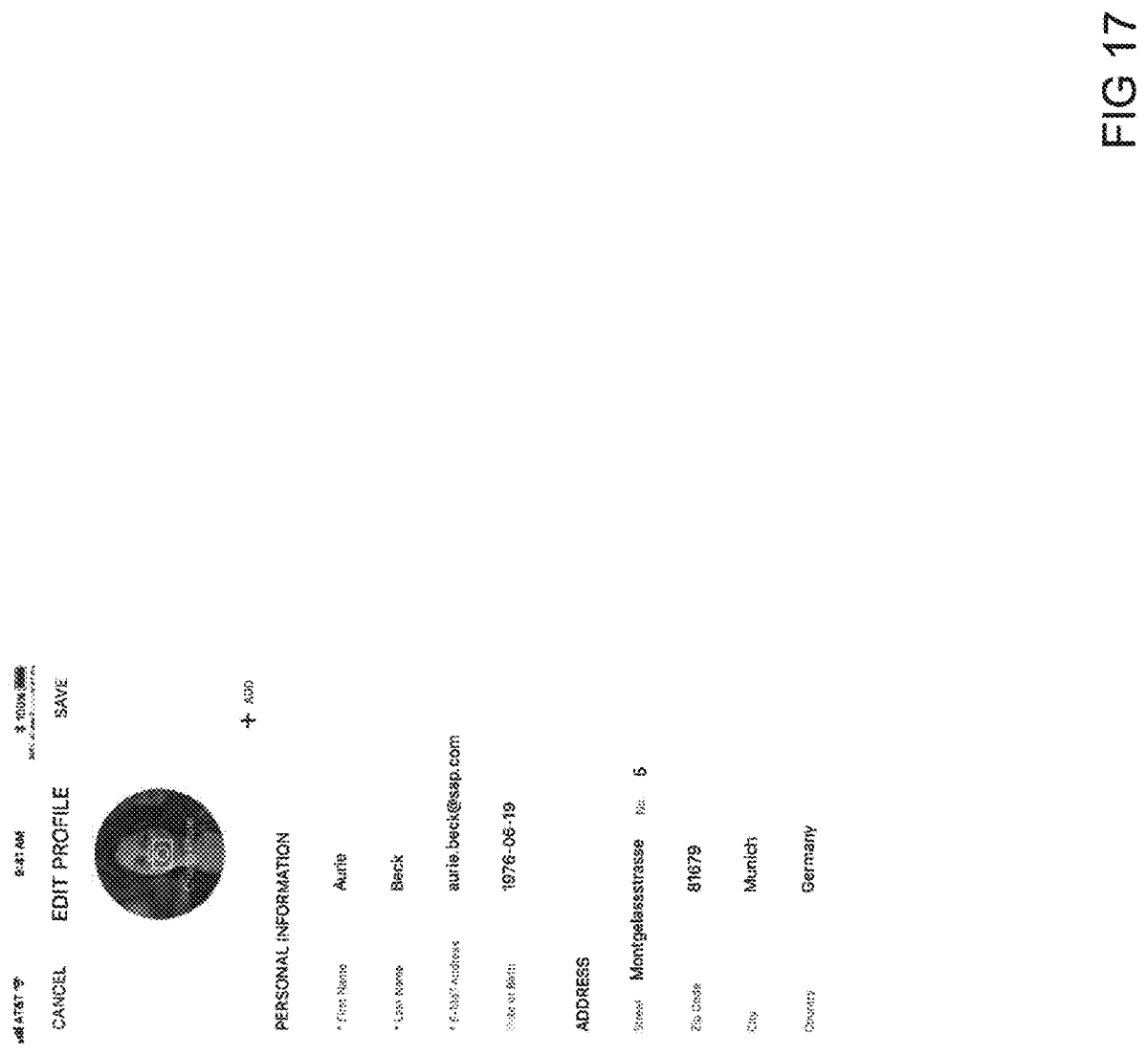

At step S123, the user may review the user profile (e.g., as shown in FIG. 16 below) and make changes to elements of personal data in the user profile, e.g., using the screen depicted in FIG. 17. At step S125, an update may be pushed out to each provider device 106 from the WebSocket service 116. The update may correspond to the changes in authorization to access personal data and/or a change to the user profile. A screen to indicate the results of the push is shown in the exemplary screenshot of FIG. 18, and described in more detail below.

Figure 4:
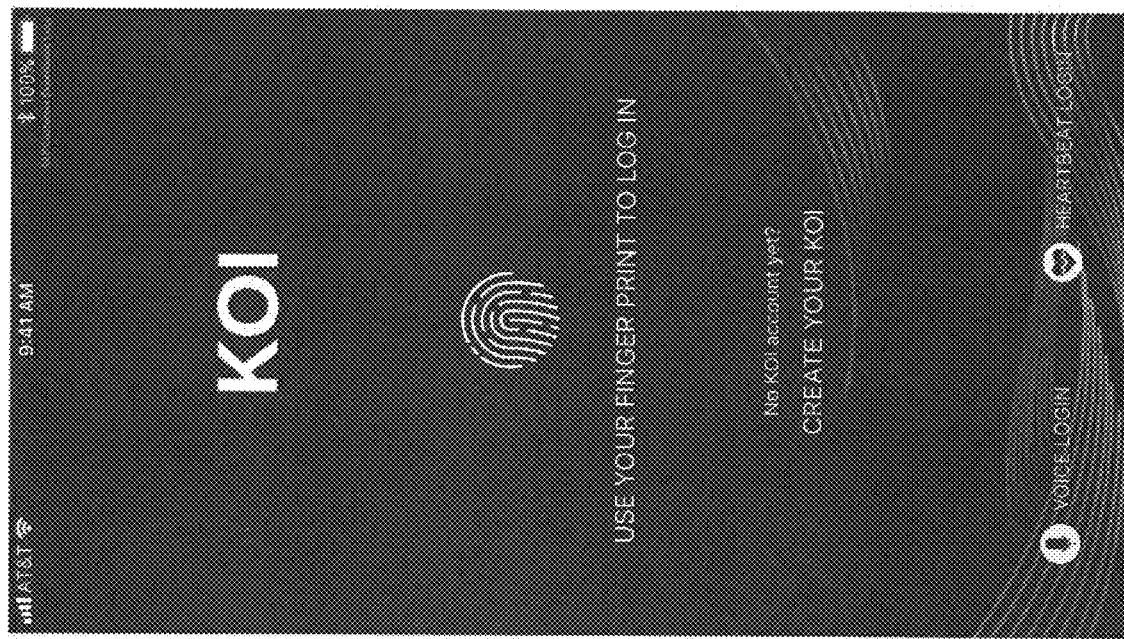
FIG. 4 shows a screenshot for authenticating a user by an identity application via a biometric identifier of a user.

FIG. 4 shows a screenshot of an exemplary authentication screen for the identity application 104. Authentication may be carried out via a biometric identifier of the user. For example, fingerprint authentication may be carried out via a fingerprint of the user. Further, as shown, voice login or heartbeat login may be used. In particular, the voice of the user or the heartbeat of the user may be analyzed in order to authenticate the user. In addition or alternatively, facial recognition may be carried out. Other forms of authentication (e.g., user name and password) may also be used.

FIG. 5 shows a screenshot of a screen from the identity application 104 that can be used to create a user account, as discussed in step S103 above. Elements of personal data are displayed, particularly, a first name (i.e., Aurie), a last name (i.e., Beck), and an email address (aurie.beck@sap.com). Data required to create the user account may be stored, e.g., in the encrypted keychain database. In the depicted example, the first name, the last name, and the email address are all stored. Other information may also be provided. Some of the stored information may be optional for some providers, and some of the information that is not stored may be mandatory for certain providers.

Figure 6:
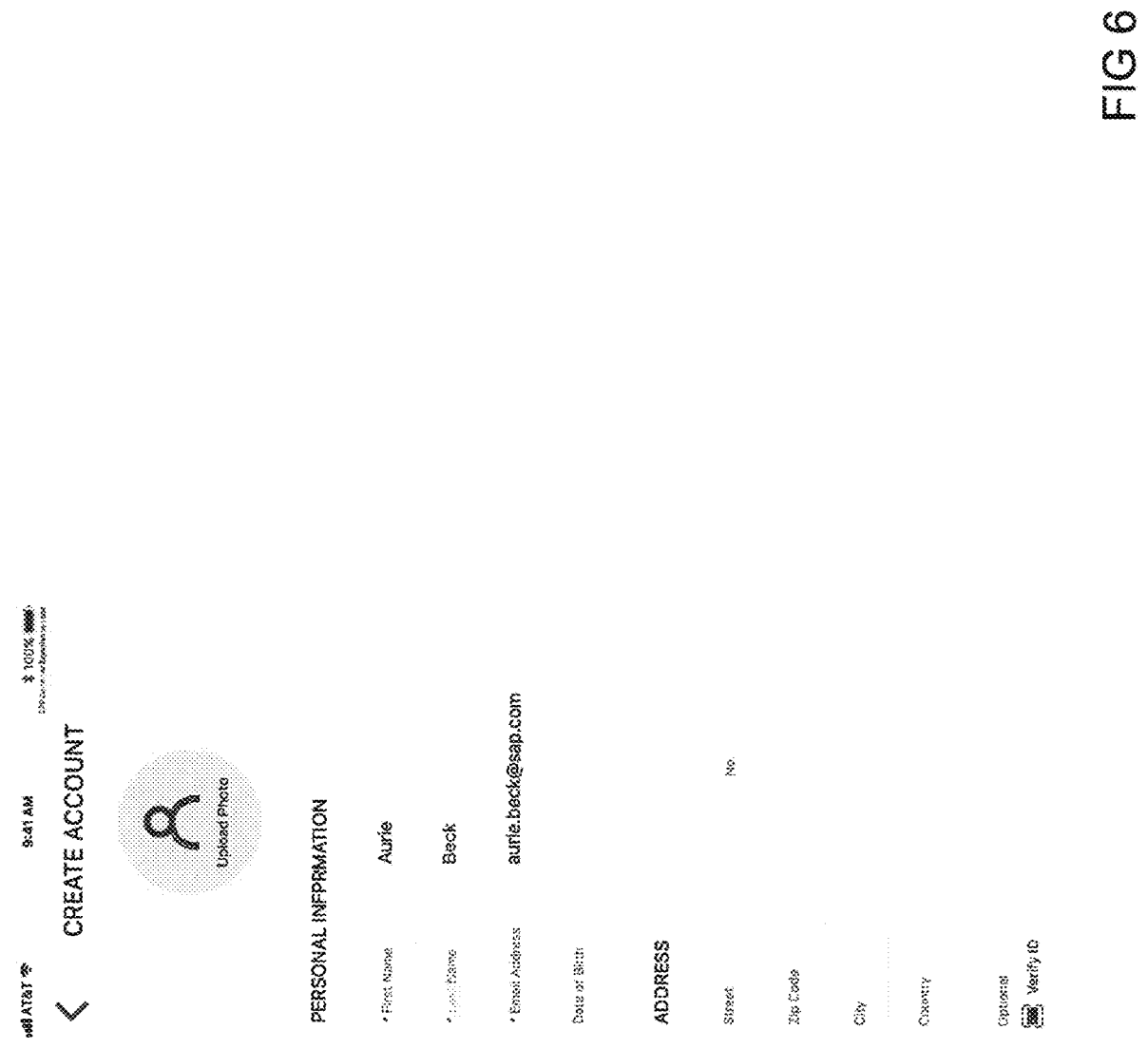

FIG. 6 shows an expanded version of the user account screen of FIG. 5. In particular, FIG. 6 includes further elements of personal data, particularly, a date of birth, a street, a street number, a zip code, a city, and a country. Additionally or alternatively, further elements of personal data, such as age and payment information (e.g. credit card name and bank account) as well as a telephone number may be included. Each separate field of information may be considered an element of personal data of the user.

Cryptographic hashes may be computed (i.e., generated) for individual elements, combinations of elements or both. For example, a cryptographic hash may be computed for the combination of the first name and the last name. Similarly, a cryptographic hash may be computed for the entire address, including the street, the street number, the zip code, the city, and the country. In other example, one cryptographic hash may be computed for mandatory personal data elements and another cryptographic hash computed for optional data elements. Thus, sets of elements of personal data may be specified for verification and cryptographic hashes may be computed for each of the sets; the hashes may be stored in the distributed database.

Figure 7:
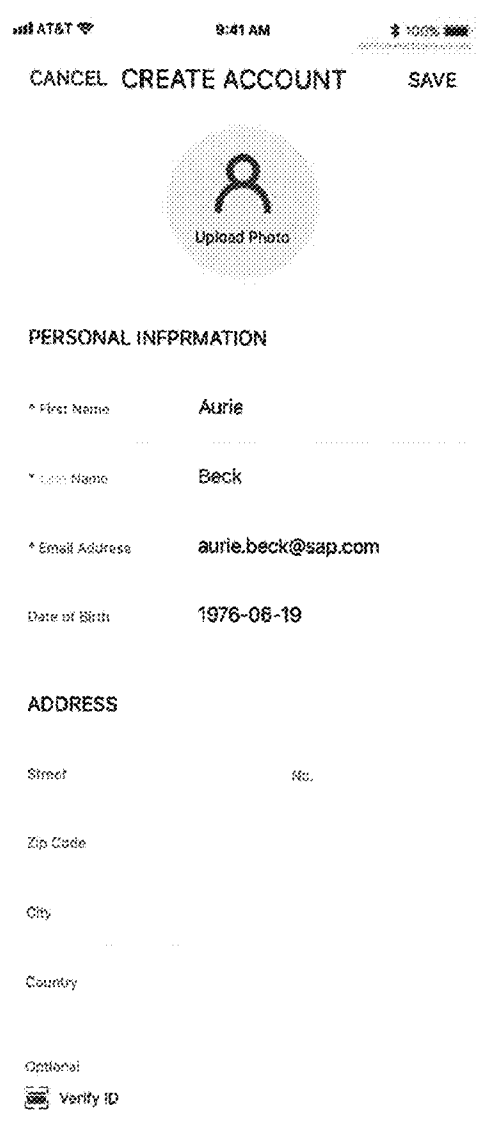

FIG. 7 shows the user account screen of FIG. 6 after a date of birth has been added. The date of birth may be stored in a normalized format (e.g. year, month, day) so that the cryptographic hash of the date of birth matches a corresponding cryptographic hash computed in order to verify the date of birth. Similarly, each element of personal data may be normalized prior to being hashed in order to ensure that a hash of a data element computed for verification will match the stored hash for the same data element.

FIG. 8 shows a screen for authenticating the user by means of the internal identifier. In order to log in by means of the internal identifier, the user would click a login button 801. The authentication by means of the internal identifier may be carried out prior to the request for verification made by the provider device 106. The authentication may be carried out when the provider device 106 includes a remote computer, as depicted in FIG. 1. Other implementations of the provider device 106 include a handheld device (e.g., a barcode ticket scanner or handheld scanner) used to scan tickets at a stadium. The handheld provider device 106 may also be capable of displaying a machine-readable representation, such as a QR code, to request verification of selected elements of the personal data of the user. In this case, the selected data elements may include the internal identifier as a mandatory data element and a first name, last name and email address as optional data elements.

In another example, a user requests permission to take part in online education or training. The provider device 106 causes a machine readable representation to be displayed on the user's desktop computer as a verification request. The identity application 104 is used to scan the machine readable representation to determine that the online education provider has selected the internal identifier and date of birth as mandatory personal data elements and the first name, last name and email address as optional personal data elements.

Figure 9:
FIG. 9 shows a screenshot indicating that the authentication of FIG. 8 was successful.

FIG. 9 shows a screenshot from the provider device 106 indicating a successful login using the internal identifier.

FIG. 10 shows a screenshot of the QR code that may be displayed by the provider device 106 in order to request verification of the selected elements of personal data.

FIG. 11 shows a screenshot from the identify application in which the QR code displayed in FIG. 10 is being scanned by the client device using the identity application 104.

FIG. 12 shows a consent request that may be carried out in response to a request by the provider device 106 for verification of selected elements of personal data. The consent request of FIG. 12 may be carried out in order to determine an authorization indication in response to the verification request. Alternatively, the authorization indication may be determined according to stored authorization information previously provided by the user. The user may specify (grant or deny) authorization for each element of personal data. For example, as shown in FIG. 12, the user may specify authorization for the first name, the last name, and the email address, in any combination.

Figure 13:
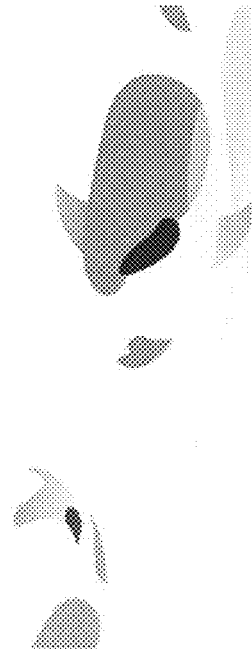
FIG. 13 shows a screenshot from the identity application indicating that the requested elements of personal data were authorized for a provider.

FIG. 13 shows that the user has provided an authorization indication indicating that the verification request from the provider device 106 has been allowed. Accordingly, the user is presented with a "Thank you" screen by the identity application 104.

FIG. 14 shows a screen from the identity application 104 that can be used to manage authorization indications for different providers. As discussed above, each provider may correspond to one or more of the provider devices 106. In this case, the providers are companies. However, the providers may be government agencies or educational institutions, or any other entity capable of providing goods or services.

Figure 15:
FIG. 15 shows a screenshot from the identity application for authorizing access to personal data elements for one of the providers depicted in FIG. 14.

FIG. 15 shows a screen from the identity application 104 in which the user manages authorization for various elements of personal data. In addition, the user may use the screen depicted in FIG. 15 to accept or reject terms and conditions provided by the provider device 106. In the example of FIG. 15, the user has requested a change to the personal data authorization for company 1. In this example, all access to personal data of the user for company 1 has been revoked. Further, a request has been sent by the identity application 104 for company 1 to delete all personal data of the user that company 1 is storing. The request may be forwarded to company 1 via the WebSocket service 116 or another one of the services of the backend 102.

FIG. 16 shows a screenshot of the user profile and the elements of personal data stored in the user profile. This screen may be used in order to inspect the user profile and determine if any information in the user profile should be changed.

FIG. 17 shows a screen for editing the user profile. Using this screen, the user can change elements of personal data in the user profile.

Figure 18:
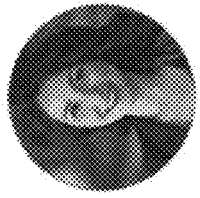
FIG. 18 shows a screenshot from the identity application depicting progress for an update corresponding to a change to the personal data of the user.

FIG. 18 shows a screen from the identity application 104 indicating progress after a change to the personal data. Accordingly, after the change, an update corresponding to the change may be sent to each provider on the list of approved providers. Each of the providers on the list of approved providers may correspond to one or more provider devices 106.

FIG. 19 shows an exemplary system for implementing the claimed subject matter including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930.

The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD-ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The data structures may include relevant data for the implementation of the method for selectively verifying personal data, as described above. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIG. 1.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 19 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 19 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. In a networked environment, program modules depicted relative to the computing environment 920, or portions thereof, may be stored in a remote memory storage device resident on or accessible to remote computer 962. Furthermore other data relevant to the method of selectively verifying personal data (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method of selectively verifying personal data.

What is claimed is:

1. A computer-implemented method for selectively verifying personal data, the method comprising:
   receiving, by an identity application of a client device, personal data of a user;
   computing, via a cryptographic hash function, one or more cryptographic hashes from elements of the personal data;
   storing the cryptographic hashes, an internal identifier and a timestamp as an entry in a distributed database,
   wherein the internal identifier is unique within the distributed database;
   receiving a user request from the user;
   selecting one or more of the elements of personal data for verification;
   requesting verification of the selected elements of personal data, wherein the verification request further comprises:
      reading, by the client device, a machine-readable representation of the verification request, wherein the machine-readable representation may include a quick response code;
      independently creating a second hash of the selected one or more elements; and
      comparing the second hash to the computed cryptographic hash;
   determining an authorization indication in response to the verification request;
   when the authorization indication indicates that the verification request has been allowed, and the selected elements of personal data are accessible, verifying the selected elements of personal data using cryptographic hashes from the entry in the distributed databases;
   maintaining, by a distribution service, a list of approved providers for the user, wherein each provider on the list is authorized to maintain at least one element of the personal data;
   receiving, by the distribution service and from the client device, a change to the personal data; and
   sending an update corresponding to the change to each provider on the list of approved providers.

2. The method of claim 1, wherein communication with the distributed database is processed via at least one distribution service,
   wherein the distribution service provides access to the distributed database and handles updates to the distributed database.

3. The method of claim 2, wherein the distributed database includes one or more of the following: a peer-to-peer network, a distributed ledger and a distributed hash table.

4. The method of claim 3, wherein the authorization indication is received from the identity application or from the distribution service,
   when the authorization indication is received from the distribution service, basing the authorization indication on information received from the identity application by the distribution service.

5. The method of claim 4, wherein a plurality of cryptographic hashes are computed from the elements of personal data,
   wherein at least one of the cryptographic hashes is computed from a combination of elements of the personal data and/or at least one of the cryptographic hashes is computed from all of the elements of personal data;
   wherein the selected elements of personal data include the combination of elements.

6. The method of claim 5, further comprising:
   storing the personal data and the internal identifier in a memory of the client device by encrypting the personal data and the internal identifier in an encrypted database in the memory of the client device.

7. The method of claim 6, further comprising:
   when the user request is received by a provider device, the verifying comprises sending one or more messages from the distribution service to the provider device via an application protocol;
   wherein the application protocol may have one or more of the following characteristics:
   asynchronous and/or non-blocking,
   bi-directional,
   full-duplex,
   TCP-based,
   HTTP-compatible.

8. The method of claim 7, further comprising:
   when the user request is received by a provider device and the provider device includes a remote computer, authenticating, by the provider device and prior to requesting the verification, the user by means of the internal identifier.

9. The method of claim 8, wherein the entry further comprises:
   a backup mode specifying whether to back up the personal data,
   a restore mode specifying how to restore backed up personal data,
   a security mode specifying how to process the personal data when the client device is lost, and
   an offline mode specifying how to share the personal data when the client device is offline.

10. The method of claim 9, further comprising:
    authenticating, prior to receiving the user request, the user by the identity application via a biometric identifier of the user;
    wherein the biometric identifier comprises a fingerprint or characteristics of facial features.

11. A computer program stored on a non-transitory medium and comprising instructions that, when executed by a computer, cause the computer to:
    receiving, by an identity application of a client device, personal data of a user;
    computing, via a cryptographic hash function, one or more cryptographic hashes from elements of the personal data;

storing the cryptographic hashes, an internal identifier and a timestamp as an entry in a distributed database, wherein the internal identifier is unique within the distributed database;

receiving a user request from the user;

selecting one or more of the elements of personal data for verification;

requesting verification of the selected elements of personal data, wherein the verification request further comprises:

reading, by the client device, a machine-readable representation of the verification request, wherein the machine-readable representation may include a quick response code;

independently creating a second hash of the selected one or more elements; and comparing the second hash to the computed cryptographic hash;

determining an authorization indication in response to the verification request;

when the authorization indication indicates that the verification request has been allowed, and the selected elements of personal data are accessible, verifying the selected elements of personal data using cryptographic hashes from the entry in the distributed database;

maintaining, by a distribution service, a list of approved providers for the user, wherein each provider on the list is authorized to maintain at least one element of the personal data;

receiving, by the distribution service and from the client device, a change to the personal data; and sending an update corresponding to the change to each provider on the list of approved providers.

12. The computer program of claim 11, wherein communication with the distributed database is processed via at least one distribution service, wherein the distribution service provides access to the distributed database and handles updates to the distributed database.

13. The computer program of claim 12, wherein the distributed database includes one or more of the following: a peer-to-peer network, a distributed ledger and a distributed hash table.

14. The computer program of claim 13, wherein the authorization indication is received from the identity application or from the distribution service, when the authorization indication is received from the distribution service, basing the authorization indication on information received from the identity application by the distribution service.

15. The computer program of claim 14, wherein a plurality of cryptographic hashes are computed from the elements of personal data, wherein at least one of the cryptographic hashes is computed from a combination of elements of the personal data and/or at least one of the cryptographic hashes is computed from all of the elements of personal data;

wherein the selected elements of personal data include the combination of elements.

16. A computer system for selectively verifying personal data, comprising:

a client device comprising an identity application, the identity application being configured to receive personal data of a user;

at least one distribution service configured to:

receive the personal data from the client device; and compute, via a cryptographic hash function, one or more cryptographic hashes from elements of the personal data;

a distributed database configured to:

store, upon request from the distribution service, the cryptographic hashes, an internal identifier and a timestamp as an entry, wherein the internal identifier is unique within the distributed database;

a provider device configured to:

receive a user request from the user;

select one or more elements of the personal data for verification;

request verification of the selected elements of personal data, wherein the verification request further comprises:

reading, by the client device, a machine-readable representation of the verification request, wherein the machine-readable representation may include a quick response code;

independently creating a second hash of the selected one or more elements; and comparing the second hash to the computed cryptographic hash;

determine an authorization indication in response to the verification request;

maintain, by the distribution service, a list of approved providers for the user, wherein each provider on the list is authorized to maintain at least one element of the personal data;

receive, by the distribution service and from the client device, a change to the personal data;

send an update corresponding to the change to each provider on the list of approved providers;

wherein the distribution service is further configured to:

when the authorization indication indicates that the verification request has been allowed, and the selected elements of personal data are accessible, verify the selected elements of personal data using cryptographic hashes from the entry in the distributed database.

17. The computer system of claim 16, wherein a plurality of cryptographic hashes are computed from the elements of personal data, wherein at least one of the cryptographic hashes is computed from a combination of elements of the personal data and/or at least one of the cryptographic hashes is computed from all of the elements of personal data;

wherein the selected elements of personal data include the combination of elements.

\* \* \* \* \*